United States Patent [19]
Force

[11] 3,912,673
[45] Oct. 14, 1975

[54] EMULSIFIER FOR ANIONIC POLYETHYLENE EMULSIONS

[75] Inventor: Carlton G. Force, Mount Pleasant, S.C.

[73] Assignee: Westvaco Corporation, New York, N.Y.

[22] Filed: Aug. 12, 1974

[21] Appl. No.: 496,635

[52] U.S. Cl.... 260/23 H; 260/23 EM; 260/29.6 PM; 260/97.6
[51] Int. Cl.[2]...................... C08F 10/02; C09G 1/08
[58] Field of Search............ 260/23 H, 97.6, 23 EM, 260/29.6 PM

[56] References Cited
UNITED STATES PATENTS 3,487,036  12/1969  Bissot............................... 260/27 R
3,753,968  8/1973  Ward................................. 260/97.6

*Primary Examiner*—Ronald W. Griffin
*Attorney, Agent, or Firm*—Richard L. Schmalz; Ernest B. Lipscomb, III

[57] ABSTRACT

Anionic polyethylene emulsions, particularly those made using the water-to-wax pressure technique of emulsification, may be prepared by using an emulsifier comprising, from 5% by weight to 95% by weight of the total emulsifier of a $C_{21}$-cycloaliphatic dicarboxylic acid of the formula

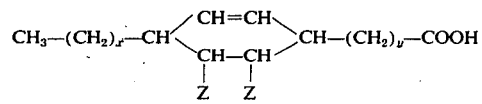

wherein x and y are integers from 3 to 9, x and y together equal 12, and Z is hydrogen (H) or a carboxyl group (COOH) with one Z of each moiety, from 0.1% by weight to 15% by weight of the total emulsifier of unsaponifiables, and from 0 to 94% by weight of the total emulsifier of oleic acid, tall oil fatty acids or other acceptable fatty acid emulsifiers. A preferred amount of the $C_{21}$-cycloaliphatic dicarboxylic acid component is from 20 to 50% of the total emulsifier with the remainder being unsaponifiables and other fatty acid emulsifier components. In the preferred range, less total emulsifier is needed to give clear emulsions than when either oleic acid or tall oil fatty acids are used alone, in some cases 30% less is needed.

2 Claims, No Drawings

EMULSIFIER FOR ANIONIC POLYETHYLENE EMULSIONS

BACKGROUND OF THE INVENTION

1. Field of the Invention

This invention relates to emulsifier compositions for use in emulsifying polyethylene. More particularly, this invention relates to the use of a particular $C_{21}$-cycloaliphatic dicarboxylic acid for emulsifying polyethylene.

2. The Prior Art

Anionically emulsified polyethylene finds uses in floor polishes and citrus fruit coatings. Pressure techniques for emulsifying polyethylene began in the late 1950's and are fully described in an article entitled "Polish Emulsion by Pressure Method" by Von Bramer and McGillen appearing in *Soap 3 Chemical Specialties*, December 1966. The procedures and techniques set forth in that article continue to be used and are quite similar to those used herein. The article also describes using oleic acid and tall oil fatty acids as emulsifiers for polyethylene.

It is, therefore, the general object of this invention to provide a mixed fatty acid emulsifier for polyethylene which uses less total emulsifier than conventional fatty acids used alone to obtain a small particle size, clear emulsion.

Another object of this invention is to provide an emulsifier for polyethylene which includes a $C_{21}$-cycloaliphatic dicarboxylic acid.

Other objects, features and advantages of this invention will become apparent from the following detailed description of the invention.

SUMMARY OF THE INVENTION

It has been found that water-to-wax anionic polyethylene emulsions may be prepared by using a fatty acid-type emulsifier comprising from 5% by weight to 95% by weight of the total emulsifier of a $C_{21}$-cycloaliphatic dicarboxylic acid of the formula

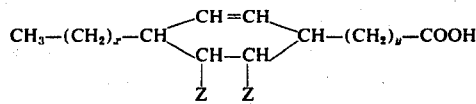

wherein $x$ and $y$ are integers from 3 to 9, $x$ and $y$ together equal 12, and Z is hydrogen (H) or a carboxyl group (COOH) with one Z of each moiety, from 0.1% by weight to 15% by weight of the total emulsifier of unsaponifiables, and from 0 to 94% by weight of the total emulsifier of oleic acid, tall oil fatty acids or other acceptable fatty acid emulsifiers. A preferred amount of the $C_{21}$-cycloaliphatic dicarboxylic acid component is 20 to 50% of the total emulsifier with the remainder being unsaponifiables and other fatty acid emulsifier components. In the preferred range, less total emulsifier is needed to give clear emulsions than when either oleic acid or tall oil fatty acids are used alone, in some cases 30% less is needed.

DETAILED DESCRIPTION OF THE INVENTION

Generally, polyethylene wax emulsions are made with polyethylene, alkali or amine, an emulsifier, and the required amount of water. The solids content of the emulsions may vary widely depending upon the end use, for example, polyethylene wax emulsions used in floor polish formulations are typically at about 15% solids.

Polyethylene waxes are made by polymerizing ethylene gas, at either high pressures or at comparatively low pressures in the presence of certain catalysts. In low density polyethylene, produced by very high pressure, the molecular structure is more random and the chains are "branched"; whereas, in the high density material the molecules have a more linear configuration and are packed more closely together. Although both types of polyethylene may be used, only a small fraction of all the polyethylene types available are suitable for wax formulations as the bulk of polyethylene is used for the production of plastics. The polyethylenes which are used in emulsions generally have an Acid Number of 10 or greater. The Acid Number is an indication of the amount of carboxyl groups present in the polyethylene and needed to form the emulsion. Thus, the polyethylene used or at least a portion thereof, for example, up to 15%, may be oxidized to increase the carboxyl content. Also, other combinations of emulsifiable waxes with the polyethylene may be included, such as carnauba, oxidized microcrystalline waxes, esterified and acid montan waxes and oxidized Fischer-Tropsch waxes.

To the polyethylene is added a base or an amine to neutralize the acidity of the polyethylene, thereby making it more easily emulsifiable. Bases for this use include potassium hydroxide or sodium hydroxide. Amines include morpholine, 2-amino-2-methyl propanol (AMP), 3-methoxy-n-propylamine (3-MPA) or 2-dimethyl amino-2-methyl-1-propanol (DMAMP) and the like. The more volatile amines, such as morpholine, will impart better water resistance at the expense of color. Generally, the base or amine is employed at a concentration of 1 part to 7 parts, preferably about 2.5 to 4.0 parts base or amine to 40 parts polyethylene depending upon the end use and method of emulsification.

Typical anionic emulsifiers may be fatty acids, such as oleic acid or tall oil fatty acids. Optimum concentration of oleic or other prior art fatty acids in an anionic emulsion is about 7 parts per 40 parts polyethylene.

However, it has been found that polyethylene emulsions may be made using an emulsifier comprising, from 5% by weight to 95% by weight of the total emulsifier of a $C_{21}$-cycloaliphatic dicarboxylic acid having the formula

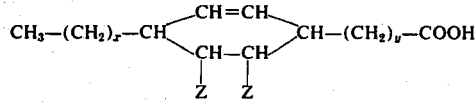

wherein $x$ and $y$ are integers from 3 to 9, $x$ and $y$ together equal 12, and Z is hydrogen (H) or a carboxyl group (COOH) with one Z of each moiety, from 0.1% by weight to 15% by weight of the total emulsifier of unsaponifiables, and from 0 to 94% by weight of the total emulsifier of oleic acid, tall oil fatty acids or other acceptable fatty acid emulsifiers. A preferred amount of the $C_{21}$-cycloaliphatic dicarboxylic acid component is 20 to 50% of the total emulsifier with the remainder being the unsaponifiables and other fatty acid emulsifier components. In the preferred range, less total emulsifier is needed to give clear emulsions than when either oleic acid or tall oil fatty acids are used alone, in some cases 30% less is needed.

The $C_{21}$-cycloaliphatic dicarboxylic acid of the formula described above is derived from conjugated and non-conjugated linoleic acid as fully described in U.S. Pat. 3,753,968 to Ward. As described in Ward U.S. Pat. 3,753,968, the $C_{21}$-cycloaliphatic dicarboxylic acid is prepared by reacting linoleic acid with acrylic acid in the presence of an iodine catalyst involving a Diels-Alder or diene synthesis-type of condensation reaction. While tall oil is a preferred source of the linoleic acid, other suitable sources include vegetable oils, such as soybean, linseed, tung, cottonseed, corn, sunflower, dehydrated castor oil and the like.

The other necessary component of the emulsifier is from 0.1 to 15% by weight of the total emulsifier of "unsaponifiable material". By the term "unsaponifiable material", it is meant the neutral materials contained in "tall oil heads". Tall oil heads are the low boiling constituents obtained from fractional distillation of crude tall oil under reduced pressure. Although the amount of tall oil heads obtained during a crude distillation may vary depending upon the conditions used and the size of the cut taken, the tall oil heads fraction typically contains from about 5 to 60% by weight of neutral materials, from about 0.1 to 1.5% rosin, and the remainder fatty acids at about 40 to 95%. Although the typical unsaponifiable component of tall oil heads is 5 to 60% of the total, most of the time the range is nearer 30 to 35% unsaponifiables. Typical properties of a tall oil heads fraction include,

| Color, Gardner | 10–18 |
| Acid Number | 75–150 |
| Saponification Number | 105–180 |
| Specific Gravity at 25°C. | 0.911–0.920 |
| Flash Point (Open Cup),°C. | 188–199 |

The tall oil heads fraction containing the unsaponifiable component, because it is low in rosin content and because the remainder is tall oil fatty acids, may for economic reasons be used. When the tall oil heads fraction containing the unsaponifiables is used as the emulsifier component, the amount used is from 0.4 to 50% by weight of the total emulsifier. The unsaponifiables may be obtained from the tall oil heads by solvent extraction and the like. In any event, maximum amounts of unsaponifiables should not exceed more than 5% by weight of the amount of the $C_{21}$-cycloaliphatic dicarboxylic acid.

The fatty acid component, when used, may be oleic acid, tall oil fatty acids, distilled tall oil fatty acids and the like.

The process used for emulsification may be by any of a number of well known prior art methods including the wax-to-water method in an open vessel or the indirect pressure method described in the Von Bramer et al. article wherein the emulsion is made at high solids concentration and additional water is added to obtain the desired concentration.

Indications are that the mechanism by which emulsification is achieved is solubilization of the polyethylene molecules in fatty acid-morpholine soap micelles. The factor controlling particle size which determines clarity (particle size of clear emulsions is <1200 A) seems to be the number of micelles present. The $C_{21}$-cycloaliphatic dicarboxylic acid is believed to increase the number of micelles present in oleic acid because of its greater water solubility in the mixed micelles and the additional carboxyl group per molecule which will increase the coulombic repulsion energy in the micelle. When the concentration of the $C_{21}$-cycloaliphatic dicarboxylic acid becomes great enough to begin to increase the critical micelle concentration, the number of micelles may again decrease causing increased particle size and emulsion turbidity. The number of polyethylene molecules solubilized in a micelle can be influenced by the number of fatty acid molecules per micelle and the amount of low molecular weight neutral hydrocarbon material also dissolved within the micelle.

The anionic polyethylene emulsions made using the emulsifiers of this invention are useful in dry-bright floor polish formulation and as protective coatings for citrus fruits.

The following examples in which the parts and percentages are by weight unless otherwise indicated are illustrative of the invention.

EXAMPLE 1

An emulsion was made using the procedure known as the pressure method with a low molecular weight polyethylene wax having the following typical properties:

| TYPICAL PROPERTIES OF THE POLYETHYLENE WAX | |
| --- | --- |
| Ring and Ball Softening Point, °C. | 106 |
| Penetration Hardness, 100 g./5 sec./ 25°C., tenths of mm. | 2.2 |
| Density, 25°C. | 0.940 |
| Acid Number | 14 |
| Viscosity[a] at 125°C. (257°F.), cp. | 1100 |
| Color, Gardner scale | 1 |
| Molecular Weight, approximate | 2500 |

[a]Brookfield, 3 spindle, 30 rpm.

In a pressure vessel 115.6 grams of the polyethylene wax (23 parts), 15 grams of emulsifier (3 parts), 13.7 grams of morpholine (2.7 parts) and 79 grams of water were melted at a temperature of 126°C. with suitable mixing for 30 minutes during which time the melt became clear. At this temperature, 22 to 28 p.s.i. was developed in the pressure vessel primarily due to steam produced from the water. After the 30-minute melting period, 288.5 grams of additional water at 90°C. to 98°C. was pumped under 40 p.s.i. pressure into the vessel while maintaining the stirring efficiency. Heating was continued for a few minutes at 126°C. with efficient stirring. This emulsifier comprised 28% by weight of the $C_{21}$-cycloaliphatic dicarboxylic acid, 8.15% by weight of tall oil heads and 63.85% by weight of oleic acid. A clear, low viscosity small particle size emulsion of the desired solids content was produced which was suitable for use in dry-bright floor polishes and required 25% less emulsifier to obtain a clear emulsion than required when using distilled tall oil fatty acid as shown in Sample Number 6 of Example 2.

EXAMPLE 2

In this example, the general procedure for making the emulsions of Example 1 was followed except that the amount of $C_{21}$-cycloaliphatic dicarboxylic acid to tall oil fatty acid was varied and the amount of total emulsifier was varied to illustrate how the emulsifier formulations of this invention require less total emulsifier than tall oil fatty acid emulsifiers alone. The tall oil head component was maintained at 29% of the $C_{21}$-cycloaliphatic dicarboxylic acid. The amount of emulsifier needed to obtain the emulsions is shown by the results in Table I.

TABLE I

EFFECT OF EMULSIFIER CONCENTRATION ON LIGHT TRANSMISSION OF POLYETHYLENE EMULSIONS

| Sample Number | Blend Quantity as % of Distilled Tall Oil Fatty Acid Required to Obtain a Clear Emulsion | % $C_{21}$-Dicarboxylic in Blend | % Transmission at 525m$\mu$ Wavelength of a 1% Solids Emulsion |
|---|---|---|---|
| 1 | 86.5 | 20 | 64.6 |
| 2 | 80 | 20 | 57.9 |
| 3 | 75 | 20 | 19.2 |
| 4 | 75 | 22 | 16.4 |
| 5 | 75 | 24 | 30.9 |
| 6 | 75 | 28 | 49.5 |
| 7 | 75 | 35 | 54.9 |
| 8 | 70 | 35 | 38.8 |
| 9 | 70 | 43 | 41.3 |
| 10 | 65 | 35 | 1.9 |
| 11 | 65 | 54 | 4.9 |

This data demonstrates that as the concentration of the $C_{21}$-cycloaliphatic dicarboxylic acid component is increased in the emulsifier, lesser amounts of total emulsifier are required to produce polyethylene emulsions of acceptable particle size and clarity.

EXAMPLE 3

This example illustrates the effect different concentrations of unsaponifiable materials produce on particle size as measured by the % transmission at 525 m$\mu$ wavelength of a 1% solids emulsion as shown in Table II. The unsaponifiables were obtained by solvent extraction from a tall oil heads fraction. Emulsions were prepared according to the procedure of Example 1 using the same polyethylene wax and varying the emulsifier composition. The emulsifier was a blend of 28% by weight of the $C_{21}$-cycloaliphatic dicarboxylic acid and 72% distilled tall oil fatty acids. To this was added the amount of unsaponifiable materials as shown in Table II. The amount of total emulsifier was 75% of the required amount of distilled tall oil fatty acids needed to give a clear emulsion.

TABLE II

| Unsaponifiables as % of $C_{21}$-Dicarboxylic Acid | % Transmission of 1% Solids Polyethylene Emulsion |
|---|---|
| 0.8 | 55.7 |
| 1.6 | 51.8 |
| 2.9 | 52.9 |
| 4.4 | 51.9 |
| 4.7 | 51.8 |
| 5.9 | 29.5 |
| 8.0 | 24.6 |
| 11.7 | 10.8 |

For an emulsion having a minimum acceptable light transmission of 30% for the required clarity and particle size, the maximum concentration of unsaponifiable material is on the order of 5.0% based on the amount of $C_{21}$-dicarboxylic acid.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. Water-to-wax anionic polyethylene emulsions wherein the emulsified comprises,
   a. from 5 to 95% by weight of the total emulsifier of a $C_{21}$-cycloaliphatic dicarboxylic acid having the formula

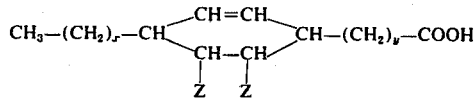

wherein $x$ and $y$ are integers from 3 to 9, $x$ and $y$ together equal 12, and Z is hydrogen (H) or a carboxyl group (COOH) with one Z of each moiety,
   b. from 0.1% by weight to 15% by weight of the total emulsifier of the unsaponifiable material in tall oil heads and wherein said unsaponifiable materials in tall oil heads are less than 5.0% by weight of said $C_{21}$-cycloaliphatic dicarboxylic acid, and
   c. from 0 to 94% by weight of a fatty acid from the group consisting of oleic acid and tall oil fatty acids.

2. The polyethylene emulsion according to claim 1 wherein said emulsifier comprises from 20 to 50% of said $C_{21}$-cycloaliphatic dicarboxylic acid.

* * * * *